United States Patent
Thubert et al.

(10) Patent No.: US 9,426,716 B2
(45) Date of Patent: Aug. 23, 2016

(54) OPTIMIZING COMMUNICATION FOR MESH ROUTING PROTOCOLS USING DIRECTIONAL BEAM FORMING

(71) Applicant: Cisco Technology, Inc., San Jose, CA (US)

(72) Inventors: Pascal Thubert, La Colle sur Loup (FR); Patrick Wetterwald, Mouans Sartoux (FR)

(73) Assignee: Cisco Technology, Inc., San Jose, CA (US)

( * ) Notice: Subject to any disclaimer, the term of this patent is extended or adjusted under 35 U.S.C. 154(b) by 539 days.

(21) Appl. No.: 13/930,046

(22) Filed: Jun. 28, 2013

(65) Prior Publication Data

US 2015/0002336 A1 Jan. 1, 2015

(51) Int. Cl.
*H04B 7/00* (2006.01)
*H04W 40/02* (2009.01)
*H04W 40/20* (2009.01)

(52) U.S. Cl.
CPC .............. *H04W 40/02* (2013.01); *H04W 40/20* (2013.01)

(58) Field of Classification Search
CPC ............ H04B 7/00; H04B 1/04; H04B 7/216; H04B 7/02; H01Q 1/00; H01Q 3/00
USPC ........................................................ 342/367
See application file for complete search history.

(56) References Cited

U.S. PATENT DOCUMENTS

| | | | |
|---|---|---|---|
| 6,101,399 A | 8/2000 | Raleigh et al. | |
| 6,665,545 B1 | 12/2003 | Raleigh et al. | |
| 7,286,855 B2 | 10/2007 | Raleigh et al. | |
| 7,884,763 B2 | 2/2011 | Na et al. | |
| 8,134,503 B2 | 3/2012 | Na et al. | |
| 8,149,942 B1 | 4/2012 | Wang et al. | |
| 8,306,001 B2 | 11/2012 | Wang et al. | |
| 8,489,039 B2 | 7/2013 | Guo et al. | |
| 2003/0109285 A1 | 6/2003 | Reed et al. | |
| 2004/0242275 A1* | 12/2004 | Corbett | H04W 16/28 455/562.1 |
| 2005/0020311 A1* | 1/2005 | Goldberg | H01Q 1/125 455/562.1 |
| 2008/0218413 A1* | 9/2008 | Li | H04B 7/04 342/367 |
| 2010/0157861 A1 | 6/2010 | Na et al. | |
| 2010/0195561 A1* | 8/2010 | Yamaguchi | H04B 7/15542 370/315 |
| 2012/0326927 A1* | 12/2012 | Nikkels | H04W 84/18 342/367 |
| 2013/0157578 A1 | 6/2013 | Nanda et al. | |
| 2013/0308470 A1* | 11/2013 | Bevan | H04W 64/00 370/252 |

FOREIGN PATENT DOCUMENTS

EP 1482654 A2 12/2004

OTHER PUBLICATIONS

Nasipuri, A. et al.: "A MAC protocol for mobile ad hoc networks using directional antennas", Wireless Communications and Networking Conference, 2000. WCNC. 2000 IEEE Sep. 23-28, 2000, Piscataway, NJ, USA, IEEE, vol. 3, Sep. 23, 2000, pp. 1214-1219.
Shen C-C et al.: "Directional Broadcast for Mobile Ad Hoc Networks with Percolation Theory", IEEE Transactions on Mobile Computing, IEEE Service Center, Los Alamitos, CA, US, vol. 5, No. 4, Apr. 1, 2006, pp. 317-332.
Levis, et al., "The Trickle Algorithm", Internet Engineering Task Force, Request for Comments 6206, Mar. 2011, 13 pages, Internet Engineering Task Force Trust.
Winter, et al., "RPL: IPv6 Routing Protocol for Low-Power and Lossy Networks", Request for Comments 6550, Mar. 2012, 157 pages, Internet Engineering Task Force Trust.

* cited by examiner

*Primary Examiner* — Harry Liu
(74) *Attorney, Agent, or Firm* — Parker Ibrahim & Berg LLC; James M. Behmke; Stephen D. LeBarron

(57) ABSTRACT

In one embodiment, a first communication is transmitted from a transmitting node in a network using a mesh routing protocol. The first communication is received at a particular node in the network. Based on the first communication, a directional attribute is computed. Based on the directional attribute, a particular direction is computed. Then, a second communication is transmitted from the particular node using a beam forming technique in the second direction.

21 Claims, 8 Drawing Sheets

OPTIMIZING COMMUNICATION FOR MESH ROUTING PROTOCOLS USING DIRECTIONAL BEAM FORMING

TECHNICAL FIELD

The present disclosure relates generally to computer networks, and, more particularly, to optimizing communication for mesh routing protocols using directional beam forming.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a mesh routing protocol called Routing Protocol for LLNs or "RPL," which is a distance vector-based routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

In the above environments, low power radio technologies, such as that described in IEEE 802.15.4, for example, are an oft-used communication method between network devices. Such communication techniques are very sensitive either to the range and energy level associated with a packet transmission. Notably, directional beam forming has been used to optimize energy usage and increase the range of radio transmissions. Thus, beam forming techniques may be employed in a network using a mesh routing protocol, e.g., RPL, so as to optimize communication between devices, and further to optimize the formation of network DAGs.

BRIEF DESCRIPTION OF THE DRAWINGS

The embodiments herein may be better understood by referring to the following description in conjunction with the accompanying drawings in which like reference numerals indicate identically or functionally similar elements, of which.

Figure 1:
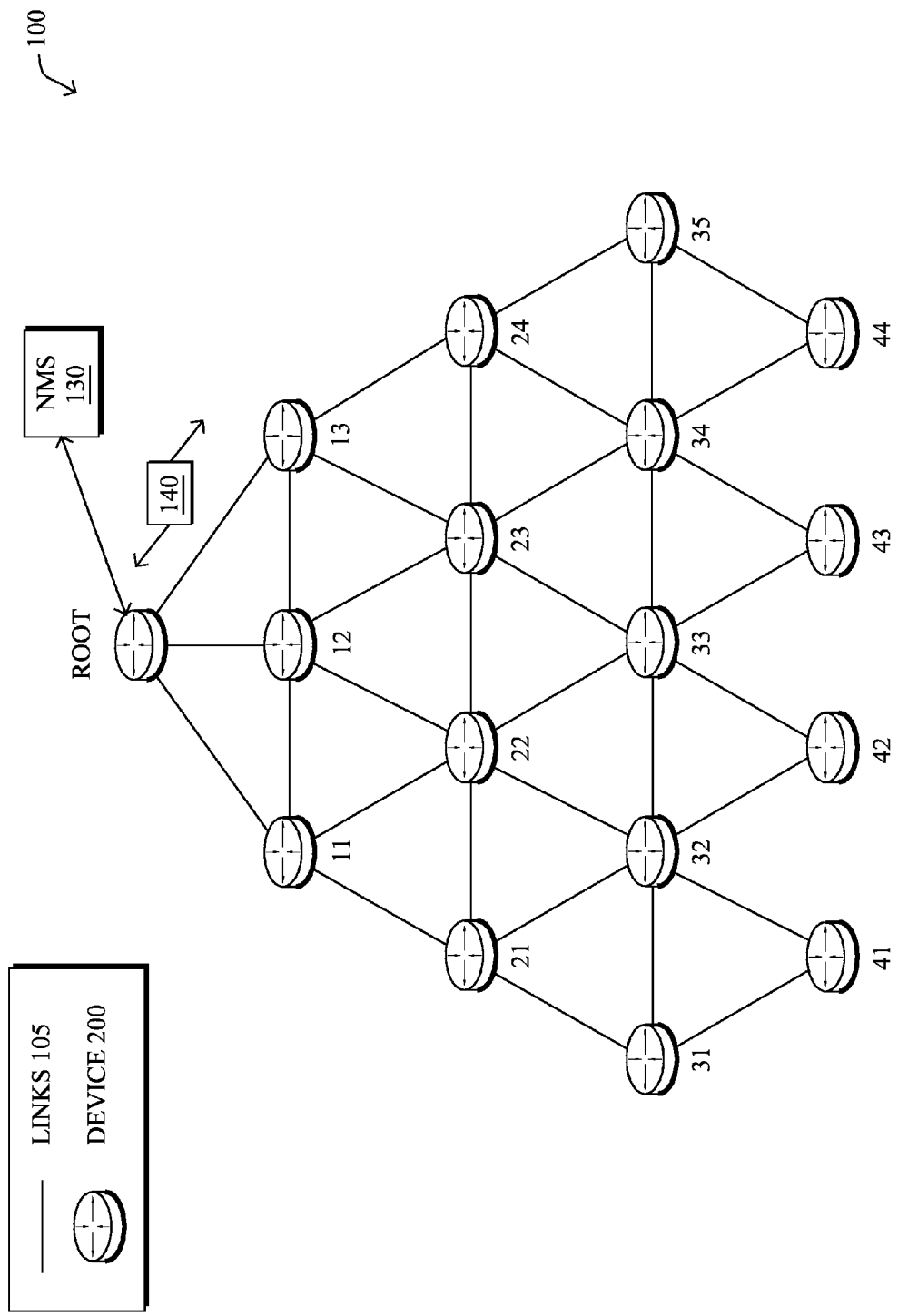
FIG. 1 illustrates an example communication network.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DESCRIPTION OF EXAMPLE EMBODIMENTS

Overview

According to one or more embodiments of the disclosure, a first communication is transmitted in a first direction from a first node in a network using a mesh routing protocol. The first communication is received at a second node in the network using a beam forming technique. Based on the first communication, a directional attribute is computed. Based on the directional attribute, a second direction is computed. Then, a second communication is transmitted from the second node using the beam forming technique in the second direction.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communication links located in the same general physical location, such as a building or campus. WANs, on the other hand, typically connect geographically dispersed nodes over long-distance communication links, such as common carrier telephone lines, optical lightpaths, synchronous optical networks (SONET), synchronous digital hierarchy (SDH) links, or power-line communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "root," "11," "12," . . . "44," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. For the purposes of the present disclosure, the computer network 100 may be of any suitable type of network, including, but not limited to, an LLN. Further, the devices 200 may be referred to as "devices" or "nodes" interchangeably.

Those skilled in the art will further understand that while the network is shown in a certain orientation, particularly with a "root" node, the network 100 is merely an example illustration that is not meant to limit the disclosure. A network management server (NMS) 130 may be in communication with the network 100, such as via the root node, e.g., a field area router (FAR), over a WAN or cellular network.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
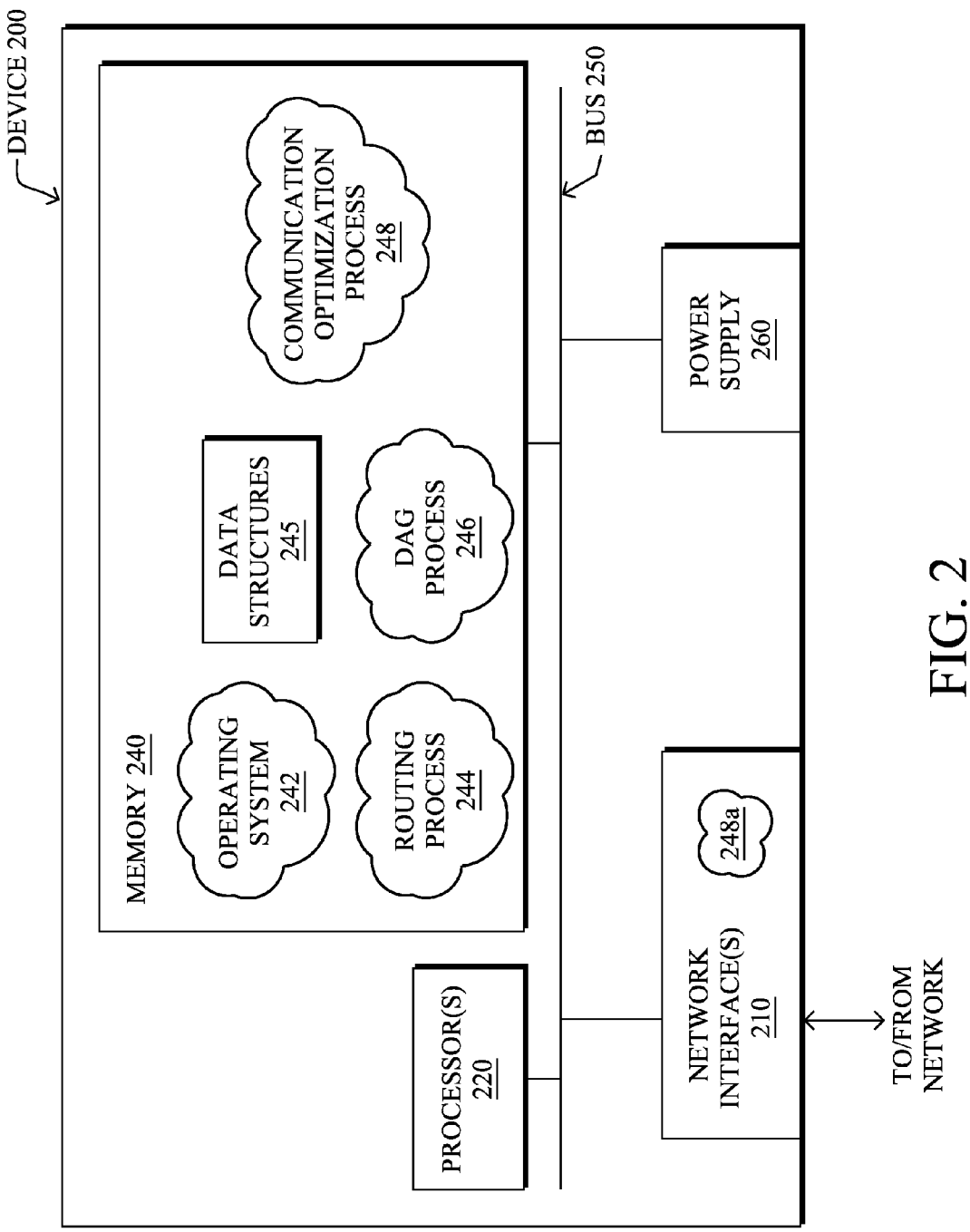
FIG. 2 illustrates an example schematic view of a network device/node.

FIG. 2 is a schematic block diagram of an example node/device 200 that may be used with one or more embodiments described herein, e.g., as shown in FIG. 1. The device may comprise one or more network interfaces 210 (e.g., wireless/channel-hopping), at least one processor 220, and a memory 240 interconnected by a system bus 250, as well as a power supply 260 (e.g., plug-in, battery, etc.), all of which may be interconnected by a system bus 250.

The network interface(s) 210, e.g., transceivers, contain the mechanical, electrical, and signaling circuitry for communicating data over wireless links 105 coupled to the network 100. The network interfaces may be configured to transmit and/or receive data using a variety of different communication protocols as noted above and as will be understood by those skilled in the art, particularly with reference herein to transmit and/or received according to various beam forming technologies. The device 200 may have multiple different types of network interfaces 210, e.g., wireless and wired/physical connections, and that the view herein is merely for illustration.

The memory 240 comprises a plurality of storage locations that are addressable by the processor(s) 220 and the network interface(s) 210 for storing software programs and data structures associated with the embodiments described herein. Note that certain devices may have limited memory or no memory (e.g., no memory for storage other than for programs/processes operating on the device). The processor(s) 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a directed acyclic graph (DAG) process 246, and an illustrative "communication optimization" process 248, as described herein. Note that while the communication optimization process 248 is shown in centralized memory 240, alternative embodiments provide for the process, or portions thereof, to be specifically operated within the network interfaces 210, such as a component of a MAC layer (process "248*a*").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor(s) 220 to perform functions provided by one or more routing protocols, such as proactive or reactive routing protocols as will be understood by those skilled in the art. These functions may, on capable devices, be configured to manage a routing/forwarding table (e.g., a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR).

Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as low-power and lossy networks (LLNs). LLNs, e.g., certain sensor networks, may be used in a myriad of applications such as for "Smart Grid" and "Smart Cities." LLNs are comprised of anything from a few dozen and up to thousands or even millions of LLN routers, and support point-to-point traffic (e.g., between devices inside the LLN), point-to-multipoint traffic (e.g., from a central control point, such as the root node, to a subset of devices inside the LLN) and multipoint-to-point traffic (e.g., from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent.

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
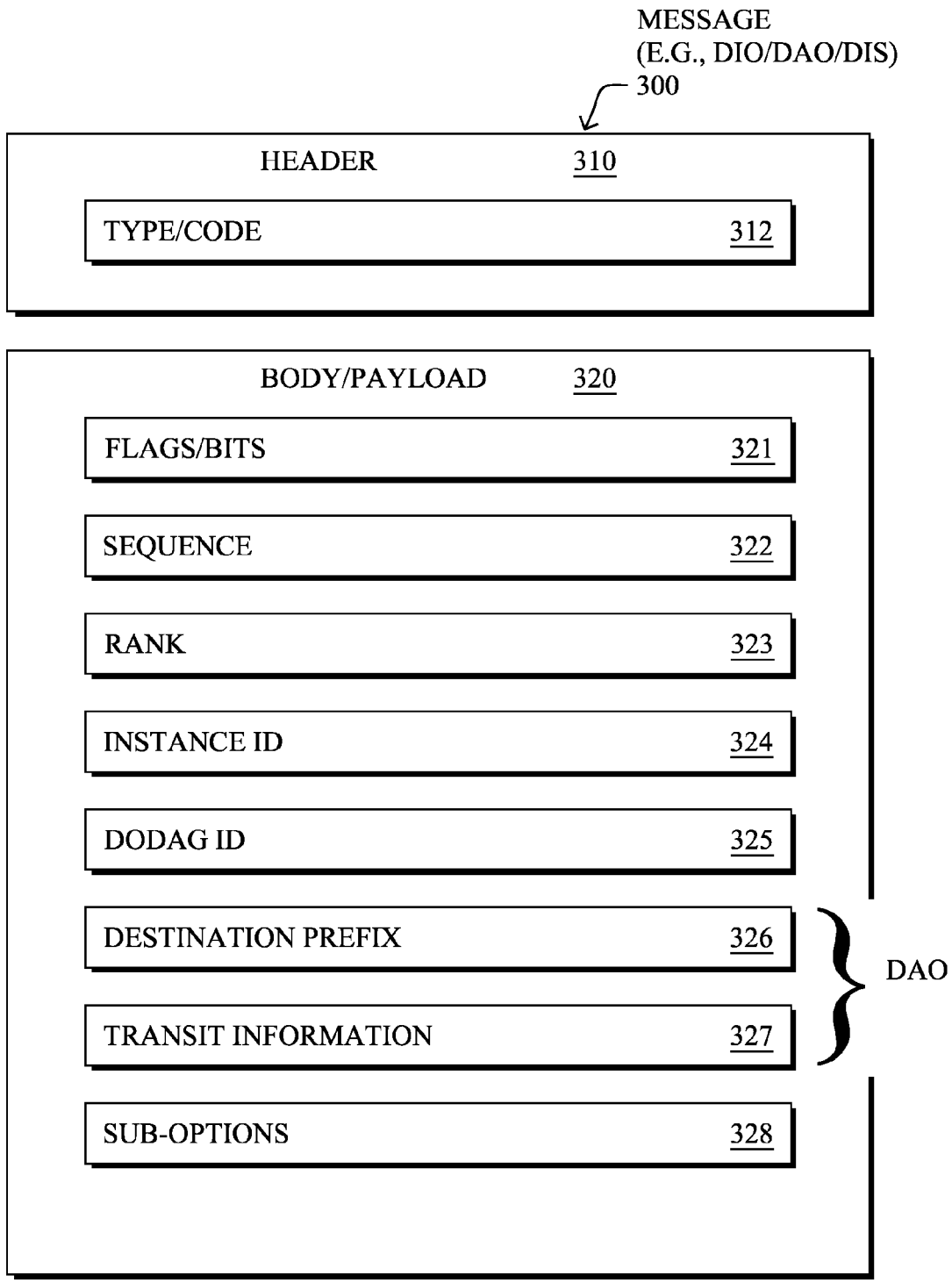
FIG. 3 illustrates an example simplified control message format that may be used for discovery and route dissemination when building a directed acyclic graph (DAG)

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
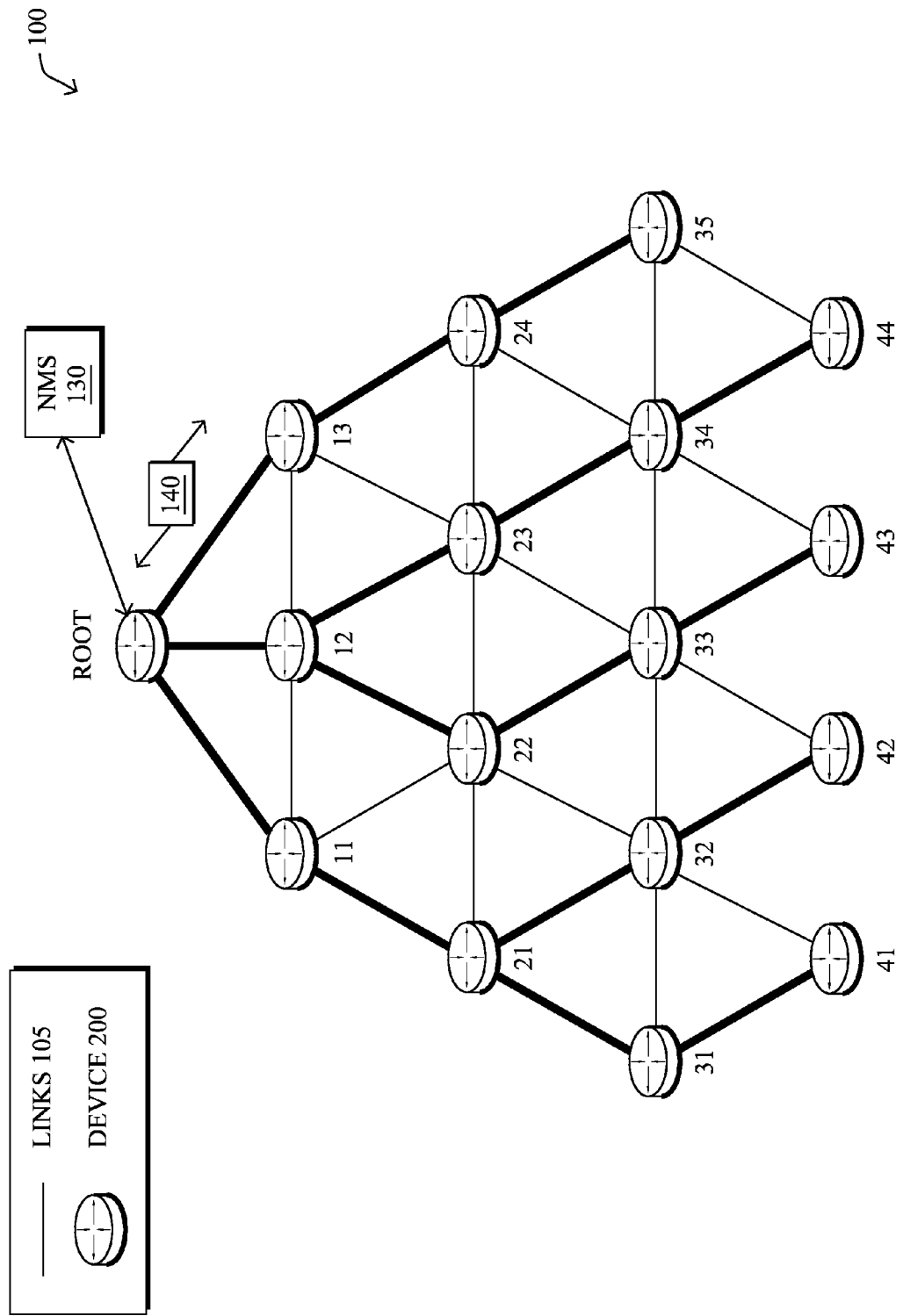
FIG. 4 illustrates an example simplified DAG in the communication network.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

As noted above, low power radio technologies, such as that described in IEEE 802.15.4, for example, are an oft-used communication method between network devices. Such communication techniques are sensitive to the range and energy level associated with a packet transmission. Notably, directional beam forming, e.g., spatial filtering, has been used to optimize energy usage and increase the range of radio transmissions. Beam forming is a signal processing technique used in sensor arrays for directional signal transmission or reception. Beam forming techniques typically utilize components including, for example, multiple-input multiple-output (MIMO) and antenna arrays, to form a radio beam which will offer the maximum transmission energy in a predefined direction. Or, when receiving packets, beam forming enables a node to determine a direction of a radio emitter and an energy level of a radio emission.

Accordingly, beam forming techniques may be employed in a network using a mesh routing protocol, e.g., RPL, so as to optimize communication in mesh environments. Moreover, beam forming may be employed to optimize the formation of DAGs in networks which apply a mesh routing protocol, e.g., by directing transmission of DIO/DAO messages, as described above.

In addition, timer-based algorithms, such as the known Trickle algorithm, may be used to further optimize communication for mesh routing protocols. In particular, the Trickle algorithm may be operated over density gradients by estimating the coverage of a first transmission from a first node. Thus, it may be determined whether a second transmission from a second node would be redundant in view of the first transmission, and if so, over which region of the network.

Optimizing Communication for Mesh Routing Protocols Using Beam Forming

The techniques herein involve using radio beam forming technology to optimize a routing protocol's control message transmission in a mesh environment. In particular, beam forming techniques are adapted to mesh routing protocol, e.g., RPL, operations, as well as Trickle operations. As a result, the routing protocol may be more sensitized to direction/orientation, thus optimizing the protocol transmission beams.

Specifically, according to one or more embodiments of the disclosure as described in detail below, a first communication is transmitted in a first direction from a first node in a network using a mesh routing protocol. The first communication is received at a second node in the network using a beam forming technique. Based on the first communication, a directional attribute is computed. Based on the directional attribute, a second direction is computed. Then, a second communication is transmitted from the second node using the beam forming technique in the second direction.

Illustratively, the techniques described herein may be performed by hardware, software, and/or firmware, such as in accordance with the "communication optimization" process 248/248a, which may contain computer executable instructions executed by the processor 220 (or independent processor of interfaces 210) to perform functions relating to the techniques described herein, e.g., in conjunction with routing process 244 (and/or DAG process 246). For example, the techniques herein may be treated as extensions to conventional protocols, such as the various wireless communication protocols, and as such, may be processed by similar components understood in the art that execute those protocols, accordingly.

Operationally, the techniques herein generally relate to, but are not limited to, optimizing communication for mesh routing protocols, e.g., RPL, using directional beam forming. In particular, beam forming may be used to optimize energy usage and increase the range of radio transmissions. Additionally, timer-based algorithms, such as Trickle, may be used to further optimize communication in mesh environments.

Figure 5:
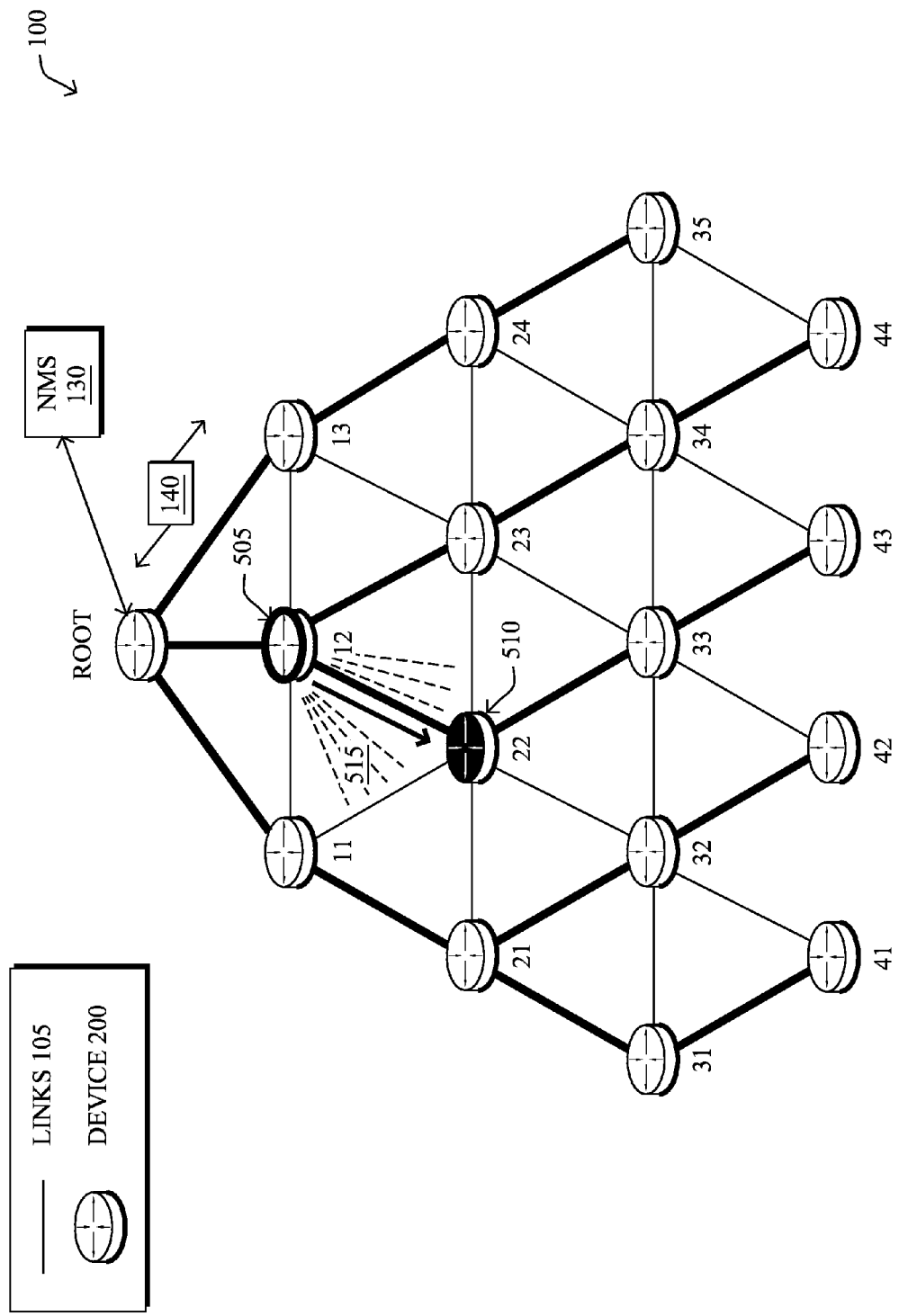
FIG. 5 illustrates an example of receiving a first communication.

FIG. 5 illustrates an example of receiving a first communication. As shown in FIG. 5, the network 100 includes nodes 200 interconnected by links 105. The network 100 may be a mesh network using a mesh network protocol, e.g., RPL. The network 100 includes a first device 505 and a second device 510.

For the purposes of the present disclosure, an example mesh routing protocol is RPL, which is a routing protocol designed for LLNs. RPL is a directional mesh routing protocol, with a sense of up (e.g., toward the root), and down (e.g., toward the child devices). Control messages, e.g., DIO messages, are flooded downwards, and may interfere with one another due the classical hidden terminal issue. Thus, beam forming may be advantageously utilized to transmit the DIO packets downwards to limit the interference and optimize the energy level of the transmission, and to focus the beam toward the next hop for unicast. As a result, lower energy may be consumed and interference may be reduced, particularly in a dense network. Although RPL is primarily described herein, the disclosed embodiments are applicable to any suitable mesh routing protocol.

The first device 505 may transmit a first communication 515 in a first direction. The first communication 515 may be received by a second device 510 using a beam forming technique. (Notably, even if the first device is unable to use beam forming techniques, the receipt of the message is from a particular direction, i.e., from the first device toward the second device, assuming the second device is capable of determining that direction, as described below.) As illustrated in FIG. 5, nodes "22" is within the coverage range of the first communication 515, and thus can receive the communication. However, depending on the coverage, e.g., transmission range and energy level, of the first communication 515, the first communication may be further received by additional devices. The first communication 515 may be, for example, a DIO or DAO control message used for node discovery and building DAGs. Although for the purposes of the present disclosure, the first communication 515 is not limited to such control messages. Moreover, the beam forming technique may encompass similar technologies, including, for example, multi-antenna phasing, as well as physical strategies, e.g., rotating antennas.

Upon receiving the first communication 515 at the second device 210, the beam forming techniques can then be leveraged. In particular, the second device 510 may compute a directional attribute based on the first communication 515. The beam forming-based computations may be leveraged to optimize an overall radio emission range for a myriad of applications, including, for example, mesh routing protocol flooding and unicast operations.

Figure 6A:
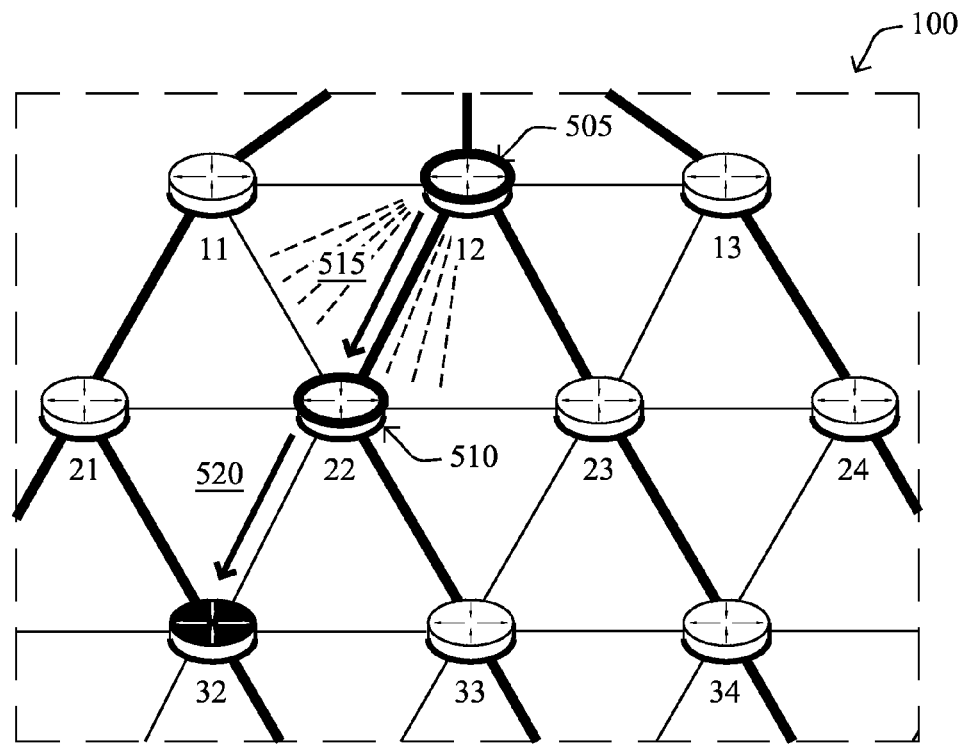
FIGS. 6A and 6B illustrate examples of transmitting a second communication using a beam forming technique.

For instance, computing the directional attribute may include computing a direction from the second node 510 toward the first node 505 (or vice versa). In this regard, FIG. 6A illustrates a first extracted section of network 100 including first node 505 and second node 510. The first node 505 may be a parent node, and the second node 510 may be a child node, for example. The second node 510 may compute a "second direction" based on the directional attribute. In this example, the second direction may be a direction generally opposite to the direction from the second node 510 to the first node 505 (that is, in generally the same direction as the first communication). As shown in FIG. 6A, after the above computations, the second node 510 may transmit a second communication 520 in the second direction, i.e., the direction opposite to the direction from the second node 510 to the first node 505. Optionally, after a period of time, the second communication 520 may be transmitted in a different direction for added direction diversity. The second communication 520 may reach a single network device, or multiple network devices, depending on the network topology and the transmission range and energy level.

Figure 6B:
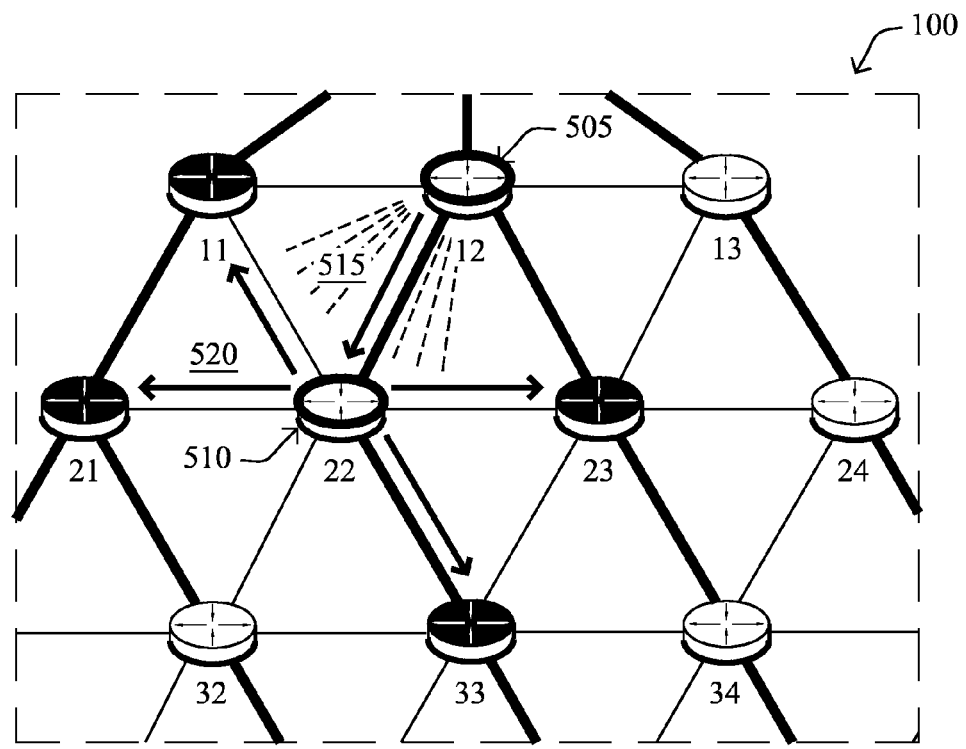

In another example, computing the directional attribute may include computing a region of the network that is substantially unreached by the first communication 515, e.g., a region of the network not covered by the communication based on the transmission range and energy level. In this regard, FIG. 6B illustrates a second extracted section of network 100 including first node 505 and second node 510. The second node 510 may compute a second direction based on the directional attribute. In this example, the second direction may be a direction from the second node 510 toward the substantially unreached region (that is, a region surrounding the receiving node other than a portion of the region from which the first communication was received; notably, the "size" of the portion may be configurable (e.g., 1-30 degrees) based on default values, device capabilities, etc.). As shown in FIG. 6B, after the above computations, the second node 510 may transmit a second communication 520 in the second direction, i.e., the direction from the second node 510 toward the substantially unreached region. The second communication 520 may reach a single network device, or multiple network devices, depending on the network topology and the transmission range and energy level.

Notably, the directional attribute is not limited to the above. To the contrary, any suitable directional attribute relating to the first communication 515 may be computed, such that the directional attribute provides a sufficient basis by which to calculate the transmission direction of the second communication 520. For example, computing the directional attribute may further include computing a direction from either the first node 505 or the second node 510 to either the substantially reached region of the network or the substantially unreached region of the network. For instance, the second node may determine a sector/region that is not well covered by other devices (e.g., peers) reporting the same information, such as to or from a same parent.

Accordingly, after receiving the first communication 515 using beam forming techniques and computing a directional attribute based on the first communication, the second node 510 may transmit the second communication 520 at an angle from the first node 505, e.g., parent node, in order to cover some area that will escape the first communication beam. Alternatively, the second transmission 520 may be transmitted in the same general direction as the first communication beam if it appears that the signal has already faded. Under either approach, the second communication 520 can provide valuable range extension of the first communication 515.

The above techniques may further be used to detect a third node (not shown) in the network 100 using the second communication 520, whereby the third node, possibly due to interference or a range issue, is isolated from the DAG in the network 100 in which the first node 505 and the second node 510 reside. For example, a rotating narrow beam, which concentrates the radio energy in a slim but long range beam, may be utilized in a manner similar to a radar system to discover isolated devices. The discovered node may be incorporated in the DAG and/or reported to a centralized management node, e.g., NMS. The above system may also be used for multicast flooding, for example, by using a directional beam to send multicast packets to multicast recipients.

Figure 7A:
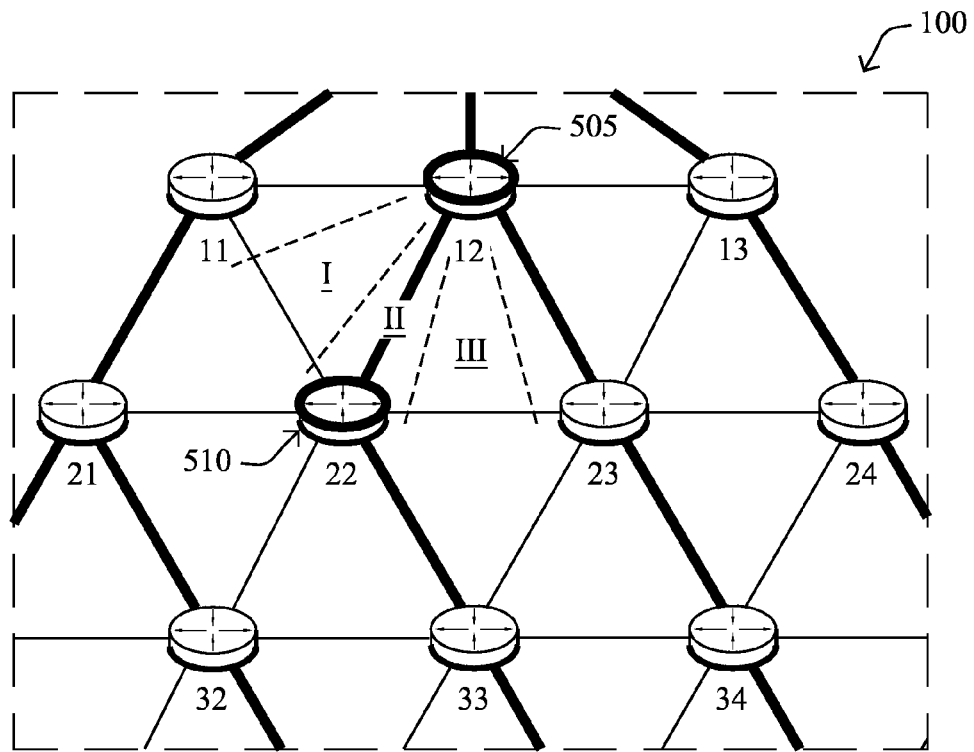
FIGS. 7A and 7B illustrate examples of transmitting the second communication using a beam forming technique according to a Trickle algorithm.
Figure 7B:
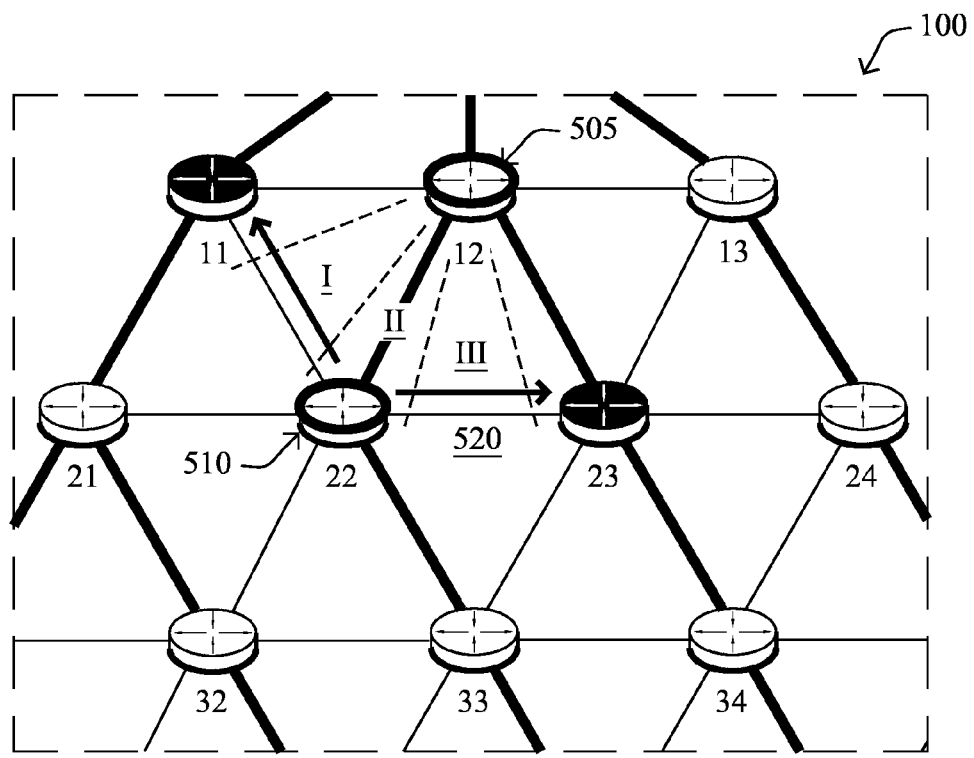

FIGS. 7A and 7B illustrate a third and fourth extracted section of network 100 including first node 505 and second node 510, whereby the second communication may be transmitted using a beam forming technique according to a Trickle algorithm. The fundamental premise of Trickle is that a device periodically transmits data to other devices unless it hears other transmissions whose data suggest its own transmission is redundant. The Trickle algorithm is known in the art, and the parameters, variables, and process steps thereof are discussed in further detail in the Internet Engineering Task Force proposed standard "Request for Comment" 6206 (RFC 6206). Notably, it should be understood that the disclosed embodiments may be compatible with, and applicable to, any similar redundancy-based transmission algorithm.

According to Trickle, there are two possible outcomes to data transmission(s) from a given device: 1) every receiving device (i.e., recipients) that hears the message finds that the message data is "consistent" with its own state (e.g., the data is redundant); or 2) any one recipient detects that the message data is "inconsistent" with its own state (e.g., the data is not redundant). Detection can be the result of either an out-of-date device hearing something new, or an updated device hearing something old.

With respect to the disclosed embodiments, the Trickle algorithm can fail in a steep gradient of node density, where a densely-populated group of nodes receives many copies of a transmission. Problematically, the densely-populated group may be located on one side of a sending node, while it may go unrealized that sparse nodes on the other side are actually starved, e.g., not receiving a copy of the transmission.

In order to remedy the above problem, the region of the network that is substantially reached by the first communication 515 may be computed, and that region may be divided into one or more sectors. As shown in FIG. 7A, the sectors of the divided region are indicated as 'I,' 'II,' and 'III.' The Trickle algorithm may then be computed per angular sector, i.e., a sector-by-sector basis.

Subsequently, the region of the network that is substantially unreached by the first communication 515 may be computed. A determination may be made whether to echo a message, e.g., the second communication 520, to a direction from which the message was not seen, e.g., a direction from the second node 510 toward the substantially unreached region. As shown in FIG. 7B, the second communication 520 may be transmitted in the direction from the second node 510 toward the substantially unreached region, e.g., toward nodes "11" and "23." The substantially unreached region may also be divided into sectors, whereby beam forming techniques may be used to transmit the second communication 520 on a sector-by-sector basis. Further, transmitting the second communication 520 in the direction from the second node 510 toward the substantially unreached region may be conditioned on whether the transmission can reach farther than previous transmissions.

The energy level, orientation, and/or origin of incoming packets, e.g., first communication 515, may be examined by the second node 510 in order to determine the direction/location of a dense nodal region. In this regard, the first communication 515 may include an indication of one or more of: i) an energy level of the first communication, ii) one or more sectors of the network to be reached by the first communication, iii) a location of the first node, and iv) an orientation of the first node. The above information may be embedded in the first communication packet by the first node 505 in any suitable manner. Each copy of the first communication 515 transmitted from the first node 505 may carry the above information. Thus, the sense of coverage and orientation may be shared by all receiving nodes.

With that information, the receiving node, e.g., second node 510, may compute an expected coverage of the first communication 515, e.g., the region that is substantially reached by the communication. Using this information, the Trickle algorithm may initially be applied to the covered space. Then, when Trickle times out, the second node 510 may direct transmission beams, e.g., second communication 520, to the areas which are not covered by the neighbor emissions, e.g., the region that is substantially unreached by the communication.

Figure 8:
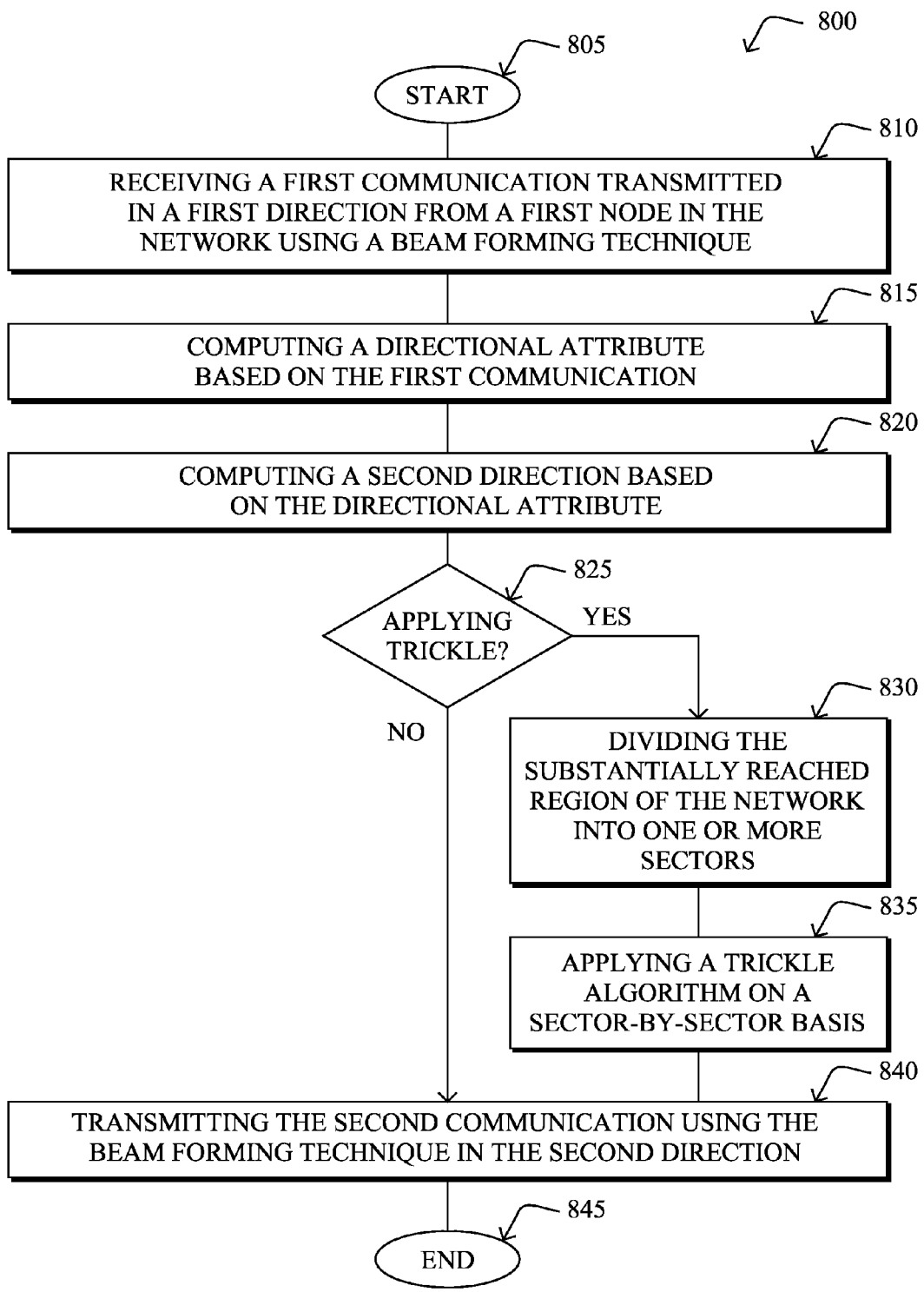
FIG. 8 illustrates an example simplified procedure for transmitting a communication using a beam forming technique in the communication network which applies a mesh routing protocol.

FIG. 8 illustrates an example simplified procedure for transmitting a communication using a beam forming technique in the communication network using the mesh routing protocol. As shown in FIG. 8, the procedure 800 may start at step 805, continue to step 810, and so forth, where, as described in greater detail above, a first communication is received using a beam forming technique, and a second communication is transmitted in a second direction using the beam forming technique.

At Step 810, the procedure 800 includes receiving a first communication transmitted in a first direction from a first node in the network, e.g., using a beam forming technique. The first communication is received at a second node in a network which applies a mesh routing protocol, e.g., RPL. At Step 815, a directional attribute is computed based on the first communication. At Step 820, a second direction is computed based on the directional attribute. At Step 825, it is determined whether to apply the Trickle algorithm, or other time-based algorithm, in conjunction with the beam forming technique. If Trickle is to be applied, the procedure 800 continues to Step 830, where the substantially reached region of the network, e.g., the region of the network which is substantially reached by the first communication, is divided into one or more sectors. Then, at Step 835, a Trickle algorithm is applied to each sector of the substantially reached region of the network on a sector-by-sector basis. If Trickle is not to be applied, the procedure 800 proceeds directly to Step 840. Notably, the second direction may be assigned a direction from the second node toward the substantially unreached region of the network, e.g., the region of the network which is substantially unreached by the first communication, or a direction opposite to the direction from the second node to the first node. At Step 840, the second communication is transmitted using the beam forming technique in the second direction. The second communication is transmitted from the second node. The techniques by which the steps of procedure 800 are performed, as well as ancillary procedures and parameters, are described in detail above.

It should be understood that the steps shown in FIG. 8 are merely examples for illustration, and certain steps may be included or excluded as desired. Further, while a particular order of the steps is shown, this ordering is merely illustrative, and any suitable arrangement of the steps may be utilized without departing from the scope of the embodiments herein.

The techniques described herein, therefore, utilize beam forming technology to optimize communication in networks which use a mesh routing protocol, e.g., RPL. In particular, the disclosed embodiments optimize the transmission range and energy level of radio emissions, in addition to optimizing the formation of DAGs. Moreover, beam forming techniques are adapted to the Trickle algorithm to sensitize network devices to direction, e.g., a sense of up (toward the root node) and down (toward the child nodes).

While there have been shown and described illustrative embodiments that provide for optimization of communication in networks which use a mesh routing protocol, it is to be understood that various other adaptations and modifications may be made within the spirit and scope of the embodiments herein. For example, the embodiments have been shown and described herein primarily with relation to LLN networks. However, the embodiments in their broader sense are not as limited, and may, in fact, be used with other types of networks and/or protocols. Additionally, the embodiments have been shown as described primarily with relation to RPL and DAG-forming control messages, e.g., DIO/DAO messages. However, it should be understood that the disclosed embodiments are not limited thereto, and may be applicable to other types of protocols and data messages.

Moreover, the foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as an apparatus that comprises at least one network interface that communicates with a network, e.g., an LLN, a processor coupled to the at least one network interface, and a memory configured to store program instructions executable by the processor. Further, it is expressly contemplated that the components and/or elements described herein can be implemented as software being stored on a tangible, non-transitory computer-readable medium (e.g., disks/CDs/RAM/EEPROM/etc.) having program instructions executable by a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a particular node in a network which applies a mesh routing protocol to form a direct acrylic graph (DAG), a first communication transmitted from a transmitting node in the network;
   computing, by the particular node, a directional attribute based on the first communication;
   computing, by the particular node, a particular direction based on the directional attribute; and
   transmitting, from the particular node, a second communication using a beam forming technique in the particular direction, wherein the beam forming technique optimizers the formation of DAG.

2. The method according to claim 1, wherein the computing of the directional attribute comprises:
   computing one or more of: i) a direction from the particular node toward the transmitting node, ii) a direction from the transmitting node toward the particular node, iii) a region of the network that is substantially reached by the first communication, iv) a region of the network that is substantially unreached by the first communication, and v) a direction from one of the particular node and the transmitting node to one of the substantially reached region of the network and the substantially unreached region of the network.

3. The method according to claim 2, wherein the particular direction is a direction opposite to the direction from the particular node to the transmitting node.

4. The method according to claim 2, wherein the particular direction is a direction from the particular node toward the substantially unreached region of the network.

5. The method according to claim 2, further comprising:
dividing the substantially reached region of the network into one or more sectors; and
applying a redundancy-based transmission algorithm to each sector of the substantially reached region of the network on a sector-by-sector basis.

6. The method according to claim 5, further comprising:
determining whether the second communication can reach farther than the first communication, wherein
the second communication is transmitted only if the second communication can reach farther than the first communication.

7. The method according to claim 1, further comprising:
detecting a third node in the network using the second communication, the third node being isolated from a directed acyclic graph (DAG) in the network in which the transmitting node and the particular node reside.

8. The method according to claim 7, further comprising:
reporting the third node to a centralized management node.

9. The method according to claim 1, wherein the first communication includes an indication of one or more of: i) an energy level of the first communication, ii) one or more sectors of the network to be reached by the first communication, iii) a location of the transmitting node, and iv) an orientation of the transmitting node.

10. The method according to claim 1, wherein the first communication is received using the beam forming technique.

11. An apparatus, comprising:
one or more network interfaces that communicate with a network which applies a mesh routing protocol to form a direct acrylic graph (DAG);
a processor coupled to the one or more network interfaces and configured to execute a process; and
a memory configured to store program instructions which contain the process executable by the processor, the process comprising:
receiving, as a particular node in the network, a first communication transmitted from a transmitting node in the network;
computing a directional attribute based on the first communication;
computing a particular direction based on the directional attribute; and
transmitting, from the particular node, a second communication using a beam forming technique in the particular direction, wherein the beam forming technique optimizes the formation of DAG.

12. The apparatus according to claim 11, wherein the computing of the directional attribute comprises:
computing one or more of: i) a direction from the particular node toward the transmitting node, ii) a direction from the transmitting node toward the particular node, iii) a region of the network that is substantially reached by the first communication, iv) a region of the network that is substantially unreached by the first communication, and v) a direction from one of the particular node and the transmitting node to one of the substantially reached region of the network and the substantially unreached region of the network.

13. The apparatus according to claim 12, wherein the particular direction is a direction opposite to the direction from the particular node to the transmitting node.

14. The apparatus according to claim 12, wherein the particular direction is a direction from the particular node toward the substantially unreached region of the network.

15. The apparatus according to claim 12, wherein the process further comprises:
dividing the substantially reached region of the network into one or more sectors; and
applying a redundancy-based transmission algorithm to each sector of the substantially reached region of the network on a sector-by-sector basis.

16. The apparatus according to claim 15, wherein the process further comprises:
determining whether the second communication can reach farther than the first communication, wherein
the second communication is transmitted only if the second communication can reach farther than the first communication.

17. The apparatus according to claim 11, wherein the process further comprises:
detecting a third node in the network using the second communication, the third node being isolated from a directed acyclic graph (DAG) in the network in which the transmitting node and the particular node reside.

18. The apparatus according to claim 17, wherein the process further comprises:
reporting the third node to a centralized management node.

19. The apparatus according to claim 11, wherein the first communication includes an indication of one or more of: i) an energy level of the first communication, ii) one or more sectors of the network to be reached by the first communication, iii) a location of the transmitting node, and iv) an orientation of the transmitting node.

20. The apparatus according to claim 11, wherein the first communication is received using the beam forming technique.

21. A tangible non-transitory computer readable medium storing program instructions that cause a computer to execute a process, the process comprising:
receiving, at a particular node in a network which applies a mesh routing protocol to form a direct acrylic graph (DAG), a first communication transmitted from a transmitting node in the network;
computing a directional attribute based on the first communication;
computing a particular direction based on the directional attribute; and
transmitting, from the particular node, a second communication using a beam forming technique in the particular direction, wherein the beam forming technique optimizes the formation of DAG.

* * * * *